May 23, 1961 D. E. BECKETT ET AL 2,985,191

BALL VALVE

Filed June 19, 1957 2 Sheets-Sheet 1

INVENTORS
DONALD E. BECKETT
WILLIAM N. BECKETT
BY

*Warren Kinney Jr.*
ATTORNEY

May 23, 1961   D. E. BECKETT ET AL   2,985,191
BALL VALVE

Filed June 19, 1957   2 Sheets-Sheet 2

*INVENTORS*
DONALD E. BECKETT
WILLIAM N. BECKETT
BY
*J. Warren Kinney Jr.*
ATTORNEY

United States Patent Office 2,985,191
Patented May 23, 1961

2,985,191
BALL VALVE
Donald E. Beckett and William N. Beckett, Wilmington, Ohio, assignors to Beckett-Harcum Co., Wilmington, Ohio, a corporation of Ohio
Filed June 19, 1957, Ser. No. 666,545
7 Claims. (Cl. 137—624)

This invention relates to valves, and more particularly to valves which utilize a pair of O-rings for effecting a highly efficient, inexpensive valve-seal in conjunction with a spherical valving member.

An object of the invention is to provide a valve which utilizes a spherical valving member located between a pair of O-rings which define intake, intermediate and exhaust chambers.

Another object of the invention is to provide a valve which may be fabricated from a minimum number of inexpensive parts to provide a highly efficient device which is particularly adapted for handling pressure media such as air and liquids.

These and other objects are attained by the means described herein and as disclosed in the accompanying drawings, in which.

Figure 1:
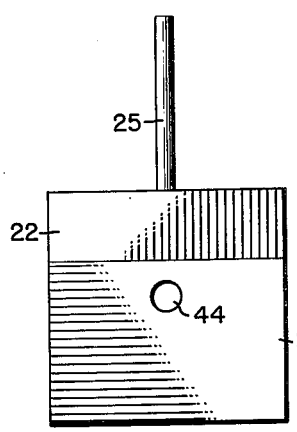
Fig. 1 is a side view of a valve embodying the teachings of the present invention.
Figure 2:
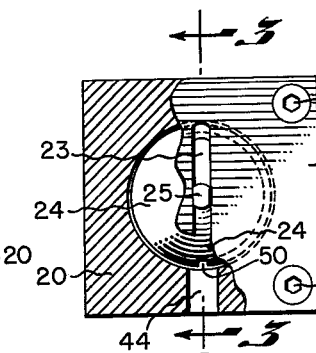
Fig. 2 is a top view of the valve of Fig. 1, with parts thereof cut away for clarity of detail and understanding.
Figure 3:
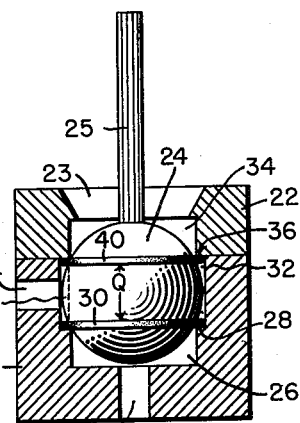
Fig. 3 is a sectional view taken on line 3—3 of Fig. 2.

With particular reference now to Figs. 2 and 3, it will be noted that the valve, in its simplest form, comprises a body portion 20, a cap portion 22 secured thereto by retaining means such as 21, and a ball valve 24.

A first chamber 26 is provided in body 20 wherein the upper end of the chamber is defined by a continuous, peripheral seat 28 for an O-ring 30; the outer diameter of which defines the periphery of a second or intermediate chamber 32.

The cap 22 includes an upper or third chamber 34 which includes a continuous peripheral edge 36 which overhangs the upper end of intermediate chamber 32 and which engages and exerts a downward, compressive force onto a second, or upper, O-ring 40 which rests upon valve 24.

The dimensions of the intermediate chamber 32 are such as to freely and loosely receive spherical valve 24; and the relationship of chambers 26 and 34 are such as to seat O-rings 30 and 40 whereby they will continuously circumscribingly engage spaced portions of the spherical valve 24. An inlet port 42 may be provided in open communication with the first or lower chamber 26 and an outlet or cylinder port 44 may be provided in open communication with the central or intermediate chamber 32, as illustrated.

A groove, slot or elongate valving port 50 is provided in the face of valve 24 wherein the overall length of said slot, groove or port is of a dimension not greater than the spacing indicated by the letter Q in Fig. 3, between the adjacent edges of O-rings 30 and 40.

Figure 4:
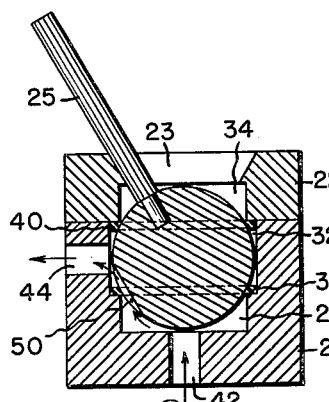
Fig. 4 is a sectional view similar to Fig. 3, showing the valve in an open position.
Figure 5:
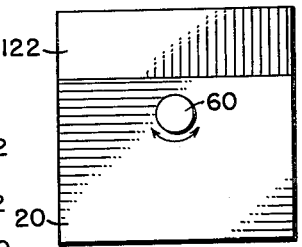
Fig. 5 is a side view of a valve which comprises a modification of the invention.
Figure 6:
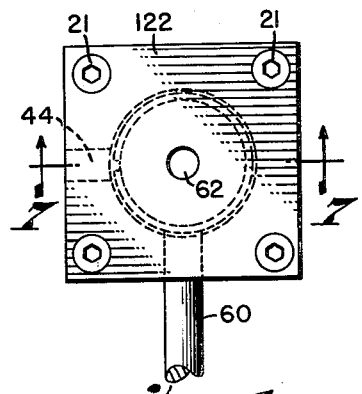
Fig. 6 is a top view of the valve of Fig. 5.
Figure 7:
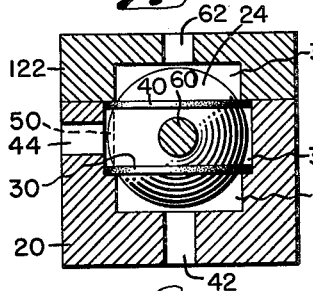
Fig. 7 is a sectional view on line 7—7 of Fig. 6, with the valve in a closed position.
Figure 8:
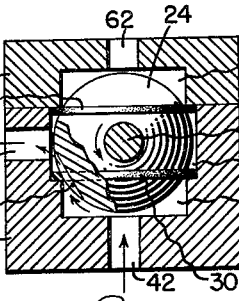
Fig. 8 is a view similar to Fig. 7 with the valve shifted to direct pressure media to a work cylinder.
Figure 9:
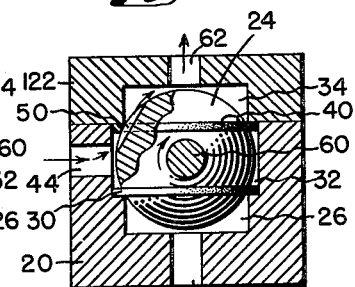
Fig. 9 is a view similar to Fig. 8, with the valve shifted to exhaust position.
Figure 10:
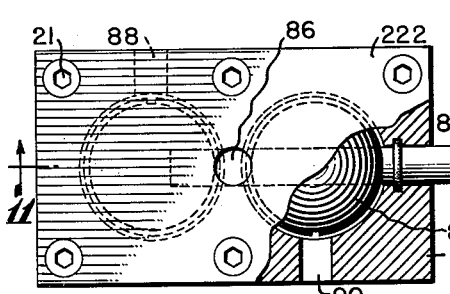
Fig. 10 is a top view of a double valve embodying the teachings of the present invention.
Figure 11:
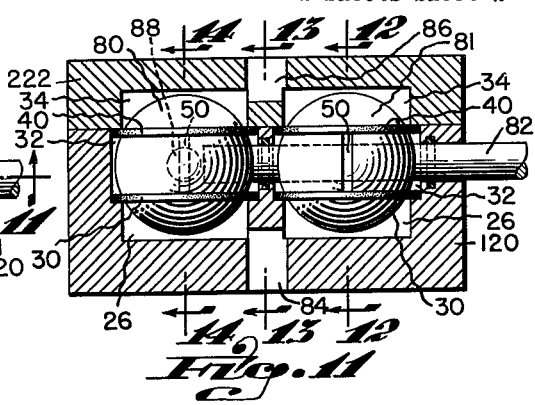
Fig. 11 is a sectional view on line 11—11 of Fig. 10.
Figure 12:
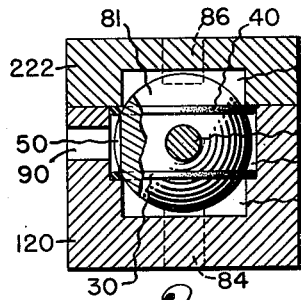
Fig. 12 is a sectional view taken on line 12—12 of Fig. 11.

When the spherical valve 24 is disposed in the off or closed position of Fig. 3, the valving port 50 is positioned entirely within the central or intermediate chamber 32, however when the valve is actuated to the position illustrated in Fig. 4, port 50 will be inclined with reference to and extend across the lower O-ring 30, for providing an open passageway between chambers 26 and 32, thereby permitting a flow of pressure media from intake port 42 to cylinder port 44.

In the device illustrated in Figs. 1 through 4, it will be noted that the intermediate chamber 32, and outlet or cylinder port 44, may be exhausted upwardly through the actuator lever slot 23 provided in cap 22 incident to rotation of valve 24 in a clockwise direction for disposing port 50 across the upper O-ring 40, thereby providing an open passageway between intermediate chamber 32 and the upper chamber 34.

From the foregoing, it will be noted that we have thus provided a highly efficient yet structurally simple valving device which utilizes a pair of O-rings, which first, provide three independent chambers 26, 32 and 34; second, provide an effective seal between the valve housing and valve 24; and third, provide the sole sealing means between body 20 and cap 22 of the valve housing. The relationship of dimension Q (Fig. 3) to the diameter of valve 24 and the location of peripheral seats 28 and 36 is such that the valve 24 is supported solely and at all times by the O-rings 30 and 40 which are continuously urged toward each other and in air- and fluidtight relationship with valve 24. The upper O-ring 40 also constitutes the sole sealing means between body 20 and cap 22, which are securely though releasably interconnected by bolts 21; said bolts serving to apply a compressive force to the O-rings. The structural details of the device enable the O-rings to be inspected, removed and replaced with ease, the only tool required being a screw driver or bolt wrench.

With particular reference now to Figs. 5 through 9, it will be noted that we have provided a rotatable shaft 60, in lieu of actuator lever 25, for controlling the operating characteristics of spherical valve 24, and in this modification a third or exhaust port 62 has been provided in cap 122 and in open communication with upper chamber 34. The turning of shaft 60 in a counter-clockwise direction will rotate the valve from the closed position illustrated in Fig. 7 to the open position of Fig. 8; whereas clockwise rotation of shaft 60 will rotate the valve to the exhaust position illustrated in Fig. 9.

Figure 13:
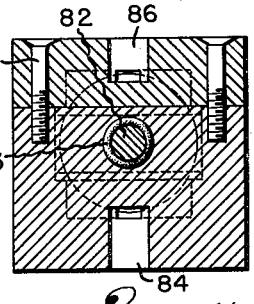
Fig. 13 is a sectional view on line 13—13 of Fig. 11.
Figure 14:
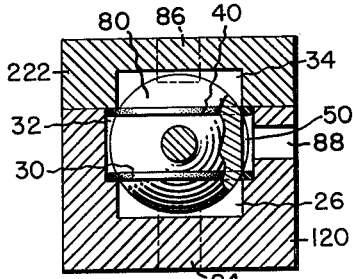
Fig. 14 is a sectional view taken on line 14—14 of Fig. 11.

In Figs. 10 through 14 we have illustrated a double valve wherein a pair of duplicate spherical valves 80 and 81 are each housed within the respective portions of a common housing comprising a body portion 120 and a removable cap 222. Duplicate lower chambers 26, intermediate chambers 32 and upper chambers 34 are provided for receiving duplicate sets of O-rings 30 and 40 which co-operate with and engage the spherical valves, as illustrated. An actuator shaft 82 interconnects the spherical valves so that they may be rotated in the same direction and by equal amounts. As best illustrated in Fig. 13, a suitable O-ring shaft seal 83 may be provided in the central web of the body portion 120 to sealingly engage the shaft and for isolating adjacent intermediate chambers 32. That portion of shaft 82 which projects outwardly through the end wall of the body portion may be sealed in a similar manner, note Fig. 11.

The numeral 84 denotes an inlet port which is in open communication with both of the lower chambers 26. The numeral 86 denotes an outlet or exhaust port which is in open communication with both of the upper chambers 34; whereas the numerals 88 and 90 denote a pair of cylinder ports.

Figure 15:
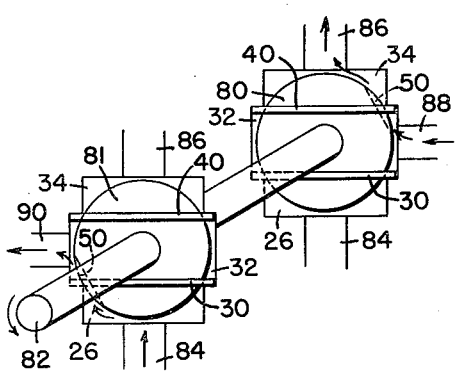
Figs. 15 and 16 are schematic views illustrating the operating characteristics of the valve of Figs. 10 through 14.
Figure 16:
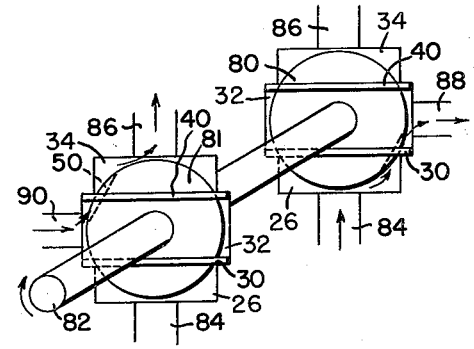

As best illustrated in Figs. 15 and 16, counter-clockwise rotation of shaft 82 will dispose port 50 of spherical valve 80 across the intermediate and upper chambers for interconnecting cylinder port 88 with exhaust port 86 while simultaneously disposing slot 50 of valve 81 across the lower and intermediate chambers associated therewith for interconnecting cylinder port 90 to intake port 84. Conversely, clockwise rotation of shaft 84 will rotate valve 80 whereby cylinder port 88 is connected to intake port 84, and valve 81 is positioned whereby exhaust port 86 is connected to cylinder port 90. It should be understood that when valve ports 50 are disposed between their respective upper and lower O-rings 30 and 40 that the inlet, outlet and exhaust ports will be positively isolated from one another.

What is claimed is:

1. A valve comprising a housing having first, second and third right cylindrical chambers disposed in endwise axial alignment, a first annular shoulder formed at the juncture of said first and second chambers, a second annular shoulder formed at the juncture of said second and third chambers, a substantially spherical valving member rotatably mounted within the housing for movement from closed to open position with portions of said member disposed within each of said chambers, an elongate valving port in the face of said member wherein the axis of said port parallels the axial alignment of said chambers when the valving member is in closed position, resilient means circumscribingly engaging said spherical member adjacent the juncture of the first and second chambers and engaging said first shoulder, and other resilient means circumscribingly engaging said spherical member adjacent the juncture of the second and third chambers and engaging said second shoulder, said resilient means establishing fluid seals between said chambers and between the spherical member and said chambers.

2. A valve comprising a housing defining a right cylindrical intermediate chamber and an intake chamber and an exhaust chamber on opposite sides of and in endwise axial alignment therewith, each of said intake and exhaust chambers terminating adjacent said intermediate chamber in a cylindrical bore of a lesser diameter than the diameter of the intermediate chamber, adjacent chambers of said housing being provided with flow ports, a substantially spherical valving member rotatably mounted within the housing with portions of said member disposed within each of said chambers, an elongate valving port in the face of said spherical valving member, resilient means within the intermediate chamber circumscribingly engaging said spherical member adjacent the juncture of the intake and intermediate chambers, and other resilient means within the intermediate chamber circumscribingly engaging said spherical member adjacent the juncture of the intermediate and exhaust chambers, said resilient means establishing a fluid seal between said intermediate chamber and the other two chambers and between the spherical member and the said three chambers when in one position and establishing communication between the flow ports in adjacent chambers when in another position.

3. A valve comprising a housing defining a right cylindrical intermediate chamber and an intake chamber and an exhaust chamber on opposite sides of and in endwise axial alignment with the intermediate chamber, each of said intake and exhaust chambers terminating adjacent said intermediate chamber in a cylindrical bore of a lesser diameter than the diameter of the intermediate chamber, a substantially spherical valving member rotatably mounted within the housing for movement between open and closed positions, and with portions of said member disposed within each of said chambers, an elongate valving port in the face of said spherical valving member, resilient means within the intermediate chamber circumscribingly engaging said spherical member adjacent the juncture of the intake and intermediate chambers, and other resilient means within the intermediate chamber circumscribingly engaging said spherical member adjacent the juncture of the intermediate and exhaust chambers, said resilient means establishing a fluid seal between said intermediate chamber and the other two chambers and between the spherical member and the said three chambers, the said valving port disposed entirely within the intermediate chamber and between the said resilient means when the valving member is in closed position, and in spanning relationship with one or the other of said resilient means for disposing the port between and in open communication with the intermediate chamber and the chamber adjacent the particular resilient means being spanned when the valving member is in open position.

4. A valve comprising a housing having two complete sets of chambers in side-by-side relationship, wherein each set of chambers includes first, second and third chambers disposed in endwise axial alignment, adjacent chambers of each set being provided with flow ports, a pair of substantially spherical valving members rotatably mounted within the housing for movement from closed to open position with portions of each of said valving members disposed within each of said chambers of a set, an elongate valving port in the face of each of said valving members wherein the axis of said ports parallels the axial alignment of said chambers when the valving members are in closed position, resilient means circumscribingly engaging each of said spherical members adjacent the juncture of the first and second chambers of each set, and other resilient means circumscribingly engaging each of said spherical members adjacent the juncture of the second and third chambers of each set, said resilient means establishing fluid seals between the respective chambers of each set and between the spherical members and their respective chambers of each set when in one position and establishing communication between adjacent ports through said valving ports when in another position, and means interconnecting said valving members for simultaneous and correlated movement to open and closed positions.

5. A valve as described in claim 4, wherein said housing includes a first shoulder at the juncture of said first and second chambers and a second shoulder at the juncture of said second and third chambers, each of said resilient means engaging one of said shoulders.

6. A valve comprising a body having two outer chambers and a chamber intermediate thereof, said chambers being in substantial alignment, the intermediate chamber being of larger diameter than the outer chambers so that annular opposing shoulders are formed at meeting edges of the intermediate chamber and the outer chambers, an annular gasket lying against each of said shoulders, a spherical valve member lying in part in each of said chambers and fitting in each of said annular gaskets, a port opening through the wall of the body into each chamber, means for turning the valve member, and the valve member having means for passing fluid between the outer chambers and the intermediate chamber through a gasket when the valve member is turned from a valve closed position to a valve open position, the last means being confined between the gaskets in the closed position of the valve.

7. The invention according to claim 6, wherein the body comprises two separable parts in one of which parts one only of the outer chambers is formed, said parts having meeting faces and the meeting face of said one part having a portion facing into the intermediate chamber and forming one of the said shoulders.

References Cited in the file of this patent

UNITED STATES PATENTS

| | | |
|---|---|---|
| 1,319,755 | Cherry | Oct. 28, 1919 |
| 1,677,242 | Larrigan | July 17, 1928 |
| 2,259,439 | De Ganahl | Oct. 21, 1941 |
| 2,297,161 | Newton | Sept. 29, 1942 |
| 2,535,580 | Kersten | Dec. 26, 1950 |
| 2,592,062 | Perry | Apr. 8, 1952 |
| 2,613,908 | Palen | Oct. 14, 1952 |
| 2,792,196 | Clade | May 14, 1957 |
| 2,845,949 | Parker | Aug. 5, 1958 |

FOREIGN PATENTS

| | | |
|---|---|---|
| 744,193 | Germany | Jan. 12, 1944 |